United States Patent [19]

Musil

[11] Patent Number: 4,595,873
[45] Date of Patent: Jun. 17, 1986

[54] CIRCUIT ARRANGEMENT FOR FEEDING ELECTRICAL USERS WITH A DC VOLTAGE

[75] Inventor: Gerhard Musil, Munich, Fed. Rep. of Germany

[73] Assignee: Siemens Aktiengesellschaft, Berlin & Munich, Fed. Rep. of Germany

[21] Appl. No.: 753,127

[22] Filed: Jul. 9, 1985

[30] Foreign Application Priority Data

Jul. 13, 1984 [DE] Fed. Rep. of Germany ....... 3425929

[51] Int. Cl.⁴ .......................................... H02M 3/156
[52] U.S. Cl. .................................... 323/222; 323/267; 323/272; 323/901; 363/21; 363/49
[58] Field of Search ............... 323/222, 267, 272, 901; 363/21, 49

[56] References Cited

U.S. PATENT DOCUMENTS 4,361,865 11/1982 Shono ............................... 363/49 X
4,450,514 5/1984 Peruth .............................. 363/49 X
4,459,651 7/1984 Fenter ............................... 363/49 X

FOREIGN PATENT DOCUMENTS 3221404 12/1983 Fed. Rep. of Germany .

OTHER PUBLICATIONS

U.S. Ser. No. 546,122, filed Oct. 27, 1983.

Primary Examiner—Patrick R. Salce
Assistant Examiner—Emanuel Todd Voeltz
Attorney, Agent, or Firm—Hill, Van Santen, Steadman & Simpson

[57] ABSTRACT

In a circuit arrangement for feeding electrical users with a DC voltage, a control circuit of a first switch controller serves as a current/voltage converter supplied from an auxiliary voltage source. Given such circuit arrangements, the auxiliary voltages should be generated with the simplest possible means and should be available as quickly as possible upon turn-on. For this purpose, the auxiliary voltage source is formed by a second switch controller whose switch element is parallel to an input of the first switch controller to which a capacitor is connected via a diode. Furthermore, the first and second switch controllers are positioned in series with one another at the input. The circuit arrangement can be advantageously employed in intermediate stations of communication transmission devices having DC current series feed.

11 Claims, 6 Drawing Figures

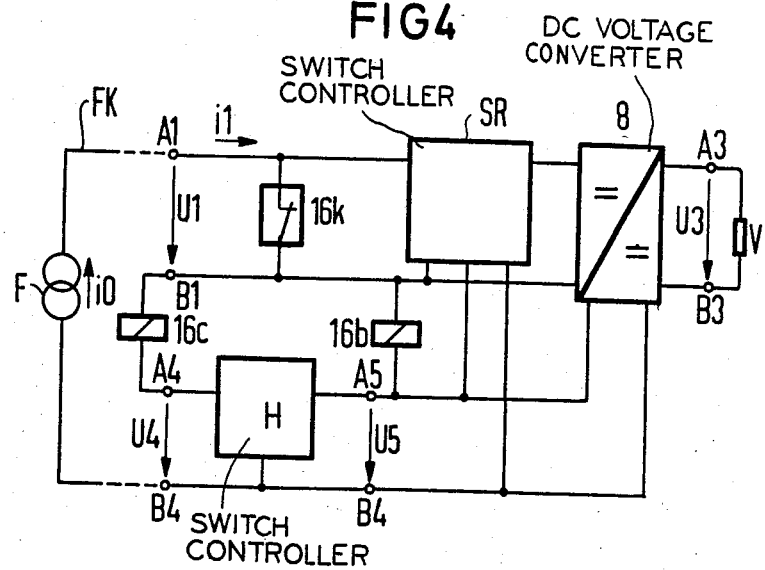
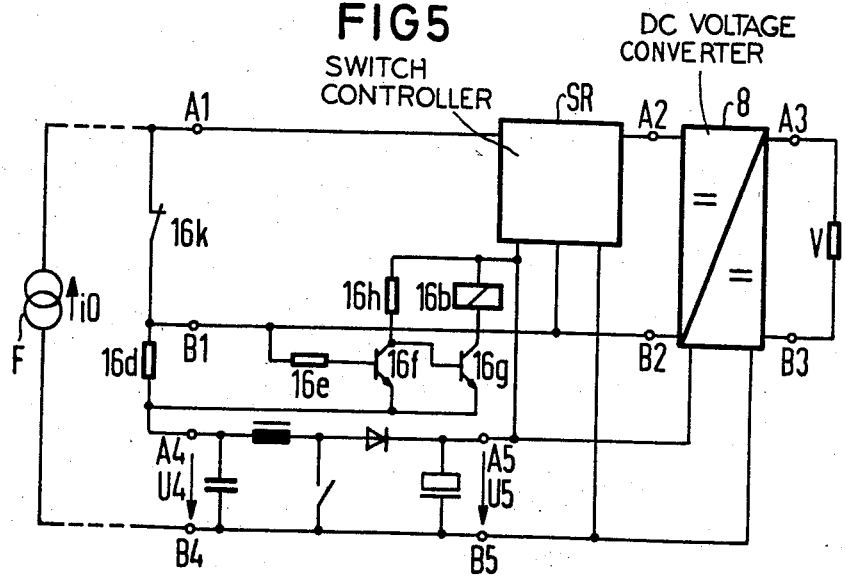

CIRCUIT ARRANGEMENT FOR FEEDING ELECTRICAL USERS WITH A DC VOLTAGE

RELATED APPLICATIONS

This application is related to the following applications of the same assignee: "Circuit Arrangement For Feeding Electrical Users Via A Switch Controller", Musil, U.S. application Ser. No. 753,115, and "Circuit Arrangement For Feeding Electrical Users", Musil, U.S. application Ser. No. 753,108.

BACKGROUND OF THE INVENTION

The invention relates to a circuit arrangement for feeding electrical users with a DC voltage wherein at least one user is connected via a first switch controller to a feed circuit fed with an impressed current. The switch controller has at least one switch element controllable by a control circuit supplied from an auxiliary voltage source.

Such a circuit arrangement is already disclosed by German OS No. 32 42 023 or by German OS No. 32 21 404, both incorporated herein by reference.

The circuit arrangement of German OS No. 32 42 023 discloses a constant-current-fed converter which generates a constant, potential-separated voltage for a variable load in such fashion that a correspondingly regulated inductance converter converts a variably accepted voltage into a stabilized voltage. The stabilized voltage is somewhat higher than the input voltage allocated to the maximum power. The output voltage is generated from the stabilized voltage potential separated by an unregulated flow converter.

Converters which are fed by a current held constant and which match their input voltage to the respectively required output power can not be supplied with auxiliary voltage without further work, like standard converters which are operated from a voltage source, since this auxiliary voltage can only be derived with greater expense both from the input voltage as well as from the output voltage. The input voltage varies greatly and the output voltage is so high, given higher powers, that either special components are required and/or higher leakage losses arise.

Also, a protection against influencing currents is not possible without further work for such devices since they reduce their output voltage with increasing input current and, for example, surge arresters such as are standard for ohmic situations, do not respond. The high currents which then flow could, however, destroy the device.

SUMMARY OF THE INVENTION

It is an object of the invention to design the circuit arrangement of the type initially specified such that the required auxiliary voltages can be generated with the simplest possible means and are available as quickly as possible after the circuit arrangement is switched on.

In accordance with the invention, the circuit arrangement provides that the auxiliary voltage source comprises a second switch controller means having a switch element parallel to an input thereof. A diode connects between the switch element and a capacitor parallel to an output of the second switch controller means. The diode is poled such that the diode is inhibited given a conductive switch element. The first and second switch controller means are connected in series with one another.

In particular, the first switch controller serving as a power converter and the second switch controller provided for generating the auxiliary voltage are of the same type.

On the basis of these techniques, the advantage results that the auxiliary voltage begins almost suddenly after a short time.

BRIEF DESCRIPTION OF THE DRAWINGS

FIG. 4 illustrates a switch controller comprising a relay contact at the input which also serves for the elimination of over-currents;

FIG. 5 illustrates a further embodiment of the arrangement of FIG. 4; and

DESCRIPTION OF THE PREFERRED EMBODIMENTS

Figure 1:
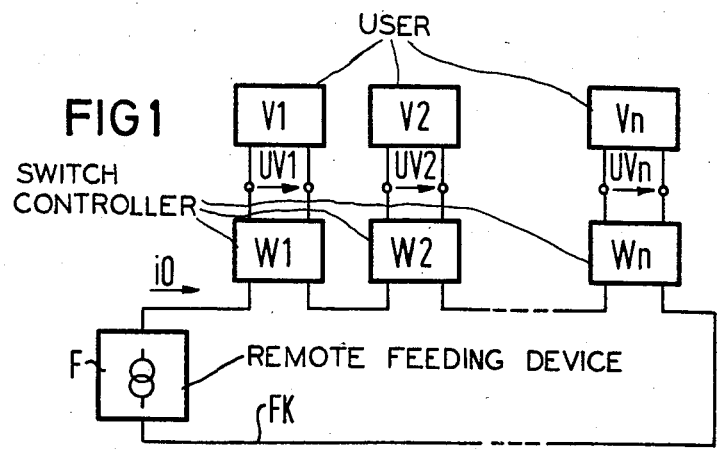
FIG. 1 illustrates a device for the remote feed of electrical users by means of DC series feed.

FIG. 1 shows a remotely fed system as a block circuit diagram. The remote feeding device F emits a constant DC current $i_o$. The users V1, V2, . . . Vn to be remotely fed are best operated with constant voltage at their feed input. The preceding switch controllers W1, W2, . . . , Wn convert the current $i_o$ impressed at their input into a constant voltage $U_{V1}$, $U_{V2}$, . . . $U_{Vn}$ for the users.

Figure 2:
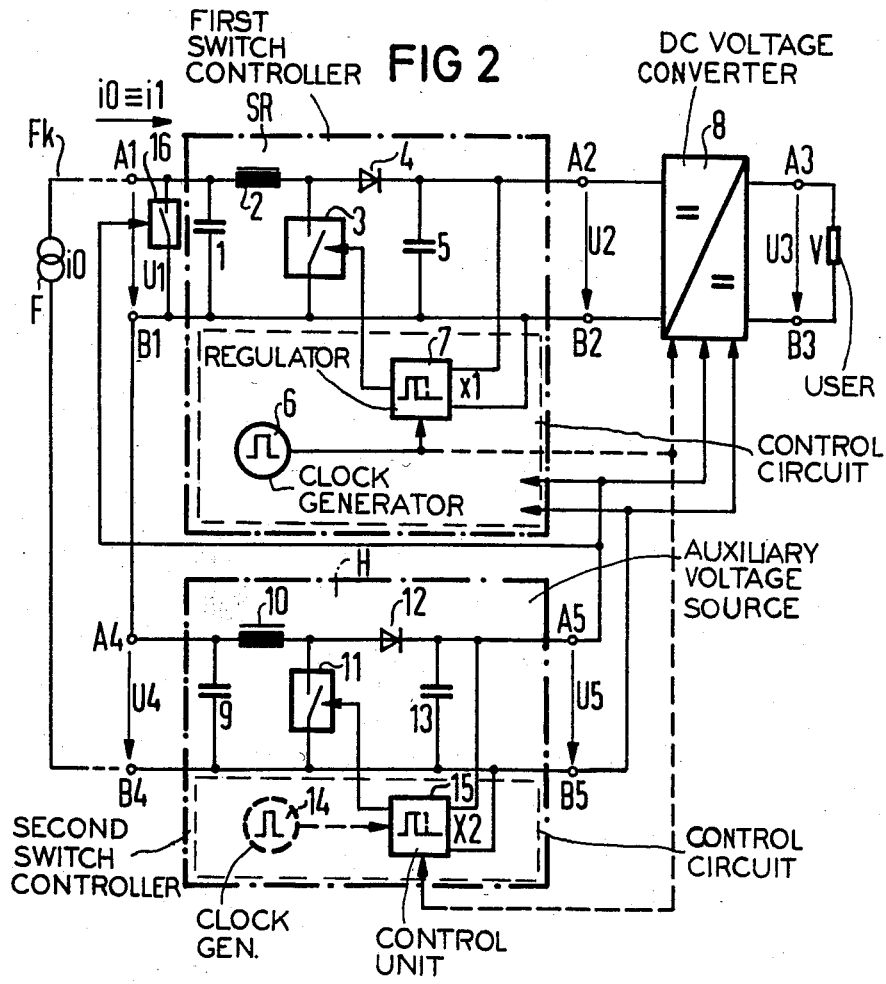
FIG. 2 illustrates a switch controller which converts an impressed DC into a constant voltage and a device for generating the auxiliary voltage.

The circuit arrangement shown in FIG. 2 contains the switch controller SR, the voltage converter 8, and the apparatus H for generating auxiliary voltage.

The switch controller SR of FIG. 2 is designed in known fashion as an inductive converter and can also be executed in some other fashion. What is essential is that it is fed at its input by an impressed current and requires an auxiliary voltage. The type shown in FIG. 2, however, is particularly advantageous since the switch controllers SR and H are of the same type and can therefore be provided with the same drive means in the simplest fashion.

Given the switch controller SR, the capacitor 1 is disposed parallel to the input and the capacitor 5 is disposed parallel to the output. The capacitors 1 and 5 and the switch element 3 are connected in unipolar fashion to one another. At the side facing away from this junction, the capacitors 1 and 5 are connected via a series connection of the choke or inductor 2 and the diode 4. The inductor 2 is at the input and the diode 4 is polarized such that it is transmissive for currents from the input to the output. The switch element 3 is disposed in a shunt arm of the switch controller between the junction of inductor 2 and diode 4 on the one hand and the junction of the capacitors 1 and 5 on the other hand.

The switch controller SR forms the actual current-voltage transformer. This is composed of the inductor 2 and of the semiconductor switch 3 which, in series with one another, lie directly in the remotely fed line train. The capacitor 1, which is small in comparison to the capacitor 5 lying at the output of the switch controller, is disposed parallel thereto.

The semiconductor switch 3 is opened and closed by a pulse-width-modulated signal in such a fashion that just enough energy from the remote feed circuit and from the energy stored in the inductor 2 and the input capacitor 1 is conducted via the diode 4 to the output capacitor 5 so that the voltage remains constant at the latter as long as a defined, maximum load current is not exceeded. This load current at this location can be at most equal to the remote feed current $i_o$. The control of the pulse-width-modulated signal occurs in the same fashion as in known inductive converters.

The DC voltage inverter 8 following the switch controller can be provided in a simple fashion according to one of the known principles because of the constant voltage U2 at its input. It is preferably an unregulated flow inverter with a decoupling transformer. Its clock frequency is advantageously taken from the same oscillator 6 which also drives the switch controller.

The device can also follow rapid load fluctuations since the input capacitor 1 is relatively small and is therefore relatively quickly re-charged to the new input voltage corresponding to the modified load case. The operating mode of the voltage converter, which is sluggish in comparison based on its principle of operation, is not affected by the change.

The clock generator 6, the regulator 7 and, under given conditions, the voltage inverter 8 require an auxiliary voltage. This is generated in the switch controller H which has the same manner of functioning as has been specified here for the switch controller SR. Mutually corresponding switch means are 9 and 1, 10 and 2, 11 and 3, 12 and 4, 13 and 5, 14 and 6, as well as 15 and 7. The switch means of the switch controller H are dimensioned for the demands prevailing there according to the same principles as in the case of the switch controller SR. Preferably the clock generator 6 is also employed for the switch controller H so that the clock generator 14 can be omitted.

The switch controller H generates a positive and a negative auxiliary voltage with respect to the potential of the terminals B1 and B2 directly connected to one another. Since the voltage U5 is greater than the voltage U4, and since both voltages relate to the potential of the terminal connection B4, B5, the positive auxiliary voltage available is the voltage U5–U4. The voltage U4 serves as a negative auxiliary voltage. Given standard dimensioning, U5 is greater than U4 by about the factor 5 to 10, this likewise meeting the demands that are generally raised. Given a remote feed current of 0.4 A, for example, usual auxiliary voltages of about 10 ... 20 V derive and the relatively low output power of the auxiliary voltage source produces a voltage U4 of about 2 V.

It is necessary for starting up the auxiliary voltage generation that, given an open switch 11, the voltage U5 first reaches the value at which the clock generator 14 and the control means 15 begin to operate. The switch controller SR is designed such that the switch 3 is first opened. Simple modifications of the switch controller also behave in this fashion, since the voltages U2 and U3 are too low at the start and the arrangement has a tendency without further techniques to initially accept as much energy as possible by opening the switch 3. Thus, since the switch 3 is also opened at first, a voltage division U1:U4 first results in an approximately inverse ratio of the values of capacitances of the capacitors 5 and 13. When the voltage U5 reaches its rated value, then the controller 15 begins to function and correspondingly drives the switch 11 with pulses such that it is periodically closed. The voltage U4 which at first is about as large as the voltage U5, is reduced to its later value within a few milliseconds. The positive auxiliary voltage U5–U4 is then available for the switch controller SR and the inverter 8. The reduced voltage U4 remains as a negative auxiliary voltage.

The positive auxiliary voltage begins very quickly in an advantageous manner. This results since, after turn-on, the capacitors 9 and 13 first charge and, upon engagement of the regulation of the switch controller H following thereupon, the voltage at the capacitor 9 which had a relatively low capacitance collapses. No transition states which, in particular, could damage sensitive power components thus occur for the circuit arrangement.

Transistors are preferably employed as switches 3 and 11, these to be operated such that the terminals A1 and A2 are respectively positive in comparison to the terminals B1 and B2. When switches of the reverse polarity are employed and a drive is also required therefore which must be supplied from a negative auxiliary voltage, then the overall arrangement applies by analogy. However, the counting arrows of the voltages U1 ... U5 and those of the currents are to be turned around. Furthermore, the anode and cathode must be respectively interchanged in the case of the diodes 4 and 12. In this case, the negative auxiliary voltage begins, as desired, within a short time and is then likewise greater than the positive auxiliary voltage by the factor 5 ... 10.

At first, the voltage U3 also runs up to a certain amount and this can be undesirable under certain conditions. A switch 16 is therefore inserted.

The switch 16 which lies at the input of the switch controller SR is initially closed and is only opened given the presence of an auxiliary voltage. Even given a slow run-up of the voltage lying between the points A1 and B4 as can be produced under certain conditions by poor dynamic properties of the remote feeding device F, or due to cable capacitances, it is thus reliably avoided that the switch controller SR accepts too much voltage in an uncontrolled fashion. The switch 16 is preferably a normally closed contact of a relay whose winding is driven by the auxiliary voltage U5–U4.

Instead of the switch 16, it is particularly advantageous to use the switch 3 which is present in any case. When a MOS field effect transistor 3m is employed at this location, then it is adequate to connect a high-resistance resistor 3f between the gate and drain thereof in order to place the transistor in an adequately conductive condition when the current $i_o$ is switched on. Such a circuit arrangement proceeds from FIG. 3.

Figure 3:
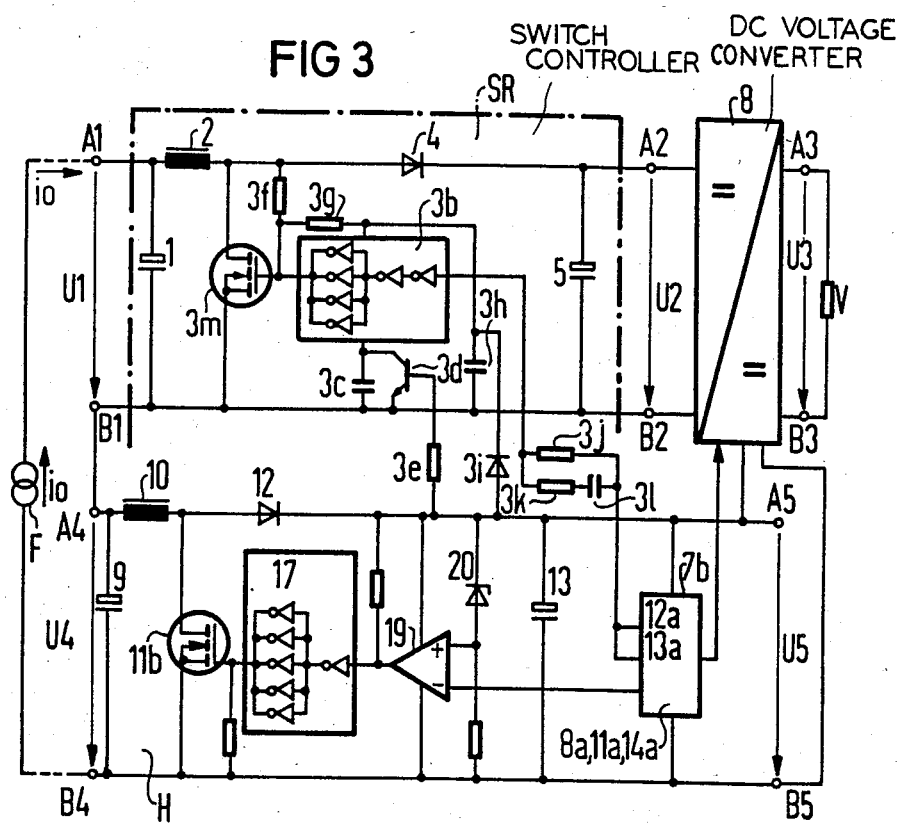
FIG. 3 illustrates a switch controller of FIG. 1 with further details of the device for generating the auxiliary voltage.

Given the circuit arrangement shown in FIG. 3, the integrated circuit SG 3524 J referenced 7b serves as a clock generator 6 and regulator 7. It generates the clock and controls the switch controller SR with width-modulated control pulses. The saw tooth voltage output by this circuit is supplied to the comparator 19 which compares it to the voltage U5 reduced by the voltage drop at a Zener diode 20. The pulses at the output of the comparator 19 control the switching transistor 11b via the driver 17. The stabilization acquired with this simple arrangement is sufficient. The voltage U5 can, for example, amount to about 13 V; the corresponding input voltage U4, given a running overall device, can, for example, amount to about 1.6 V given a remote feed current $i_o = 0.4$ A.

The additional components 3f...3l around the drive module 3b of the switch 3 in the controller SR prevent the voltages in the auxiliary inverter H, which are initially negative in comparison to the potential of the terminal B1, from placing a negative voltage on the gate of the field effect transistor 3m and thus prevent closing of this switch. As a result thereof, it is also possible to keep the resistor 3f lying between the gate and drain of the field effect transistor 3m as such a high-resistance that it only causes very slight losses in the operating condition.

This type of auxiliary voltage generation can also be combined in an advantageous fashion with current-fed inverters executed in some other fashion, and likewise in combination with the switch 16 or its replacement by the switch 3, when the current-fed inverter to be supplied has such a switch lying in the path of the remote feed current $i_o$. It can also be advantageous to provide both an auxiliary voltage source for positive voltages relative to the terminal B1 as well as one for negative voltages relative to the terminal A1.

After the run-up of the auxiliary voltage, the switch 16 is open and/or the switch 3 is driven with pulses by the drive device 7. Since the voltage U2 is initially still too low, the regulation in and of itself would run to the maximum possible input voltage U1. For specific uses, the switch controller SR is preferably dimensioned such that an overload produced, for example, by a malfunctioning user V can also be governed at least for a brief duration. In a remote feed device having many users, one need generally count on only one or a few such overload situations. When the switch controller SR during turn-on—which of course occurs simultaneously for all switch arrangements of FIG. 1 in such a remote feed device—behaves like it behaves when handling overload situations, then the constant current source of the remote feed device must be correspondingly dimensioned. It is then over-dimensioned for practical operation, or can perhaps not be realized at all. Additional techniques can be undertaken which prevent a simultaneous turn-on of all devices. This, however, requires a differing design or adjustment of the remotely fed devices.

The regulated drive module 7 is operated such that a pulse sequence having a fixed or at least restricted pulse duty factor is first output, and thus a voltage $U_{7\ on}$ is established at the terminal pair A1, B1 during the entire start-up operation which is lower than the maximum possible input voltage $U_{1max}$ after the conclusion of the start-up operation. The switch controller SR is operated and the capacitor 5 charged at first with the power consumption allocated to the voltage $U_{7\ on}$. When the voltage U2 exceeds its rated value by a defined, small amount $\Delta U2$, then this is acquired by the regulator 7 as a deviation and the regulator 7 is switched into its normal operating mode. The regulation then initially reacts with a reduction of the input voltage U1, whereby the voltage U2 also drops. When the rated value of the voltage U2 is reached, the input voltage U1 allocated to the output power is established.

It is advantageous to choose the pulse duty factor during start-up such that the power consumption at that time is just slightly higher than would be established when the user V absorbs its nominal power. Malfunctioning users having too high a power consumption are then automatically not fully connected.

It is also advantageous to choose the pulse duty factor such that, proceeding from the operating case wherein the remote feed device must emit its highest power, the possible power consumption for the start-up of the switch controllers is calculated and the corresponding pulse duty factor is subsequently calculated. The shortest possible start-up time is thus obtained for the remote feed device without having to provide unnecessary reserves for the operating mode.

It is also advantageous to select the pulse-duty factor such that the users are first entirely or partially disconnected, and the possible power consumption for the start-up of the switch controller is chosen according to the operating situation for which the lowest remote feed voltage is available per device. The user or users are then connected after the start-up operation. The initiation of this operation preferably occurs by use of the same device which also recognizes the end of the start-up operation and switches to the normal operating mode.

Current-voltage converters with input-side matching of the voltage to the respectively required power consumption reduce their input voltage when the input current is boosted. The fact that this boost is attributable to a malfunction, usually to induction of a current from outside of the system, can not be perceived. A slight elevation of the current in the remote feed circuit is of no significance at first and does not deteriorate the function of the circuit arrangement. When the current in the remote feed circuit, however, rises above a certain degree, then either the switch 3 must also be dimensioned for this or the danger exists that the circuit arrangement will fail.

The remote feed current is acquired with a sensor element. The converter can be bridged by an additional current path during the time of impermissible overcurrent, this additional current path being selected proceeding from the sensor element and eliminating the overcurrent. This current path is formed in a particularly simple fashion by the same devices which also short-circuit the switch controller SR serving as the main converter during the start-up of the auxiliary voltage.

The switch 16 of FIG. 2 insures that the input of the switch controller SR is bridged during the time of an impermissably high input current $i_o$. The switch 3 of the switch controller SR can also be advantageously employed for this purpose. Although it must be designed in this case for the overcurrent, it need not switch this current with the clock frequency. This represents a significant alleviation.

According to FIG. 4, the switch 16 is provided as a relay which has a normally closed contact 16k in order to guarantee the start-up behavior of the circuit arrangement. After the run-up of the auxiliary voltage U5-U4, it is opened by this voltage via the winding 16b. For the elimination of the overcurrents, a second winding in the line sequence of terminals B1-A4, or preceding the terminal A1 or following terminal B4, is expediently provided for the relay 16. This second winding closes the normally closed contact in the sense of a make contact. This winding is shown in FIG. 4 between the terminals B1 and A4, and is referenced 16c. The second winding, however, is dimensioned such that the auxiliary voltage can hold the contact of the relay open given normal remote feed current. What is particularly advantageous in such a solution is that disruptions of the auxiliary voltage produced, for instance, by high, superimposed alternating currents, to which the auxiliary inverter H can not properly react, contribute to closing the contact 16 in the same fashion, and this does not allow operation of the switch controller SR serving as power inverter until the auxiliary inverter H functions properly.

Instead of a second winding, a current sensor in the form, for example, of a resistor which indirectly or directly closes the switch 16, can lie in the line sequence A1–B4. Such a solution is indicated in FIG. 5. In FIG. 5, the voltage drop at a resistor 16d controls a transistor 16f via a resistor 16e, this transistor 16f being inhibited given normal remote feed current. Driven via the resistor 16h, the transistor 16g can therefore carry current and open the normally closed contact 16k via the winding 16b as soon as the auxiliary voltage U5–U4 commences. When the remote feed current $i_o$ exceeds a prescribed value, then the transistor 16f becomes conductive. The transistor 16g which is then inhibited enables a closing of the normally closed contact 16d. Similar to the case shown in FIG. 6, the circuit can also be preferably constructed with a time delay in order to function more smoothly, given alternating currents.

A further advantageous possibility is to close the switch 3 given overcurrent. In this case, however, the auxiliary inverter H must continue to operate at least adequately in order to guarantee an active drive of the switch 3. That is usually possible given the generally comparatively low power output of the auxiliary inverter H.

Figure 6:
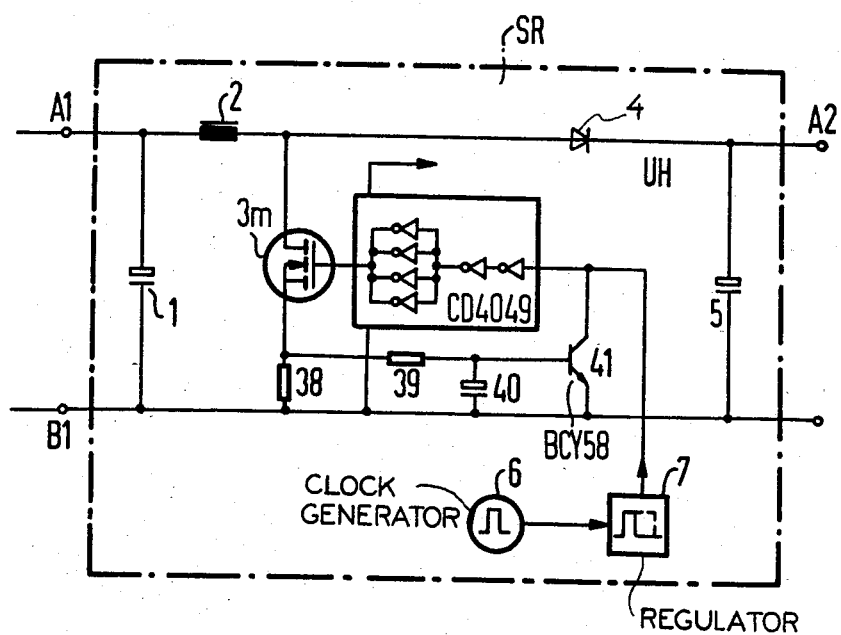
FIG. 6 illustrates a switch controller whose switch element is additionally used for the elimination of over-currents.

FIG. 6 shows circuit details from a circuit arrangement wherein the switch 3 is employed for the elimination of the overcurrent. The current is acquired as a voltage drop at a 1Ω-resistor 38 lying in series with the power MOS field effect transistor BUZ 45 A, forming the switch 3, and is conducted via an RC element 39, 40 to a transistor 41. The transistor 41 operates on the line sequence of the drive in such a fashion that the switching transistor 3m remains constantly conductive. Since only high overcurrents are to be acquired, it is of little significance whether the sensor element lies directly in the path of the remote feed current or in series with the switch 3 where the current flowing in the output circuit of the switch controller SR is not acquired.

The described techniques for bridging the switch controller SR during start-up of the auxiliary voltage, and given overcurrent, can also be combined. For example, a relay 16 can be provided with a normally closed contact which is closed by the auxiliary voltage, and a second relay can be provided which has a make contact parallel to this normally closed contact, and which is closed by a winding in the remote feed circuit, given an overcurrent. Although these combinations are more involved, they can yield advantages in the realization under given conditions since the components or modules respectively employed need only handle one of the two required jobs, and can therefore be more easily matched thereto.

The relay with its normally closed contact and its windings 16b and 16c from FIG. 4 can, under given conditions, be designed as an electronic relay or electronic circuit, with or without the relay, and can therefore also use the switch 3.

The circuit arrangement can be fed in a remote feed system of FIG. 1 in common with identical or different, further circuit arrangements. The circuit arrangements W1 . . . Wn can be identically or differently designed and/or dimensioned.

Given a preferred embodiment of the circuit arrangement of FIG. 3, the value of the resistor 3f is 2 MΩ; the value of the resistor 3g is 100 kΩ; and the value of the resistor 3j is 1 MΩ. A diode having a small leakage current is selected as diode 3i.

Although various minor changes and modifications might be proposed by those skilled in the art, it will be understood that I wish to include within the claims of the patent warranted hereon all such changes and modifications as reasonably come within my contribution to the art.

I claim as my invention:

1. A circuit arrangement for feeding electrical users with a DC voltage, comprising:
    a first switch controller means for connecting at least one user to a feed circuit fed with an impressed current;
    said first switch controller means having at least one switch element controllable by a control circuit means supplied from an auxiliary voltage source;
    said control circuit means controlling the switch element dependent on a DC voltage at an output of said first switch controller means which is to be kept at least approximately constant;
    the auxiliary voltage source comprising a second switch controller means having a switch element parallel to an input thereof;
    a diode between the switch element and a capacitor parallel to an output of the second switch controller means, said diode being poled such that the diode is inhibited given a conductive switch element; and
    the first and second switch controller means being connected in series with one another at their inputs.

2. A circuit arrangement according to claim 1 wherein a controllable switch is connected for control by the second switch controller means such that the controllable switch is opened only given an auxiliary voltage at and parallel to the input of the first switch controller means.

3. A circuit arrangement according to claim 2 wherein the controllable switch is a normally closed contact of a relay whose winding is controlled by the second switch controller means by a difference between an output voltage and input voltage of the second switch controller means.

4. A circuit arrangement according to claim 2 wherein the controllable switch is formed by the switch element of the first switch controller means.

5. A circuit arrangement according to claim 2 wherein the controllable switch is controllable by a current sensor means in series with an input of the first switch controller means such that the controllable switch is closed given currents which exceed a prescribed limit value.

6. A circuit arrangement according to claim 5 wherein the current sensor means is in series with the switch element of the first switch controller means; and the switch element is controllable by the current sensor means such that it closes given currents which exceed a prescribed limit value.

7. A circuit arrangement according to claim 3 wherein the relay is provided with two windings, one of which is connected to an auxiliary voltage and the other of which is connected to sense current.

8. A circuit arrangement according to claim 1 wherein a voltage converter between an output of the first switch controller means and at least one user is connected to the auxiliary voltage source.

9. A circuit arrangement according to claim 1 wherein the control circuit means of the first switch controller means and a control circuit means in the second switch controller means connected to the switch element therein are connected to a common clock generator.

10. A circuit arrangement according to claim 1 wherein the second switch controller means is designed such that an output voltage thereof is greater than an input voltage, and wherein one auxiliary voltage is the input voltage and another auxiliary voltage is a difference between the output voltage and input voltage of the second switch controller means so that the auxiliary voltage source outputs a positive and a negative auxiliary voltage.

11. A circuit arrangement for feeding electrical users with a DC voltage, comprising:

- a first switch controller means for connecting at least one user to a feed circuit fed with an impressed current;
- said first switch controller means having at least one switch element controllable by a control circuit means supplied from a second switch controller means;
- said control circuit means controlling the switch element dependent on a DC voltage fed to a user which is to be kept at least approximately constant;
- the a second switch controller means having a switch element parallel to an input thereof;
- control circuit means controlling the switch element of the second switch controller means;
- a diode between the switch element and a capacitor parallel to an output of the second switch controller means, said diode being poled such that the diode is inhibited given a conductive switch element; and
- inputs of the first and second switch controller means being connected in series with one another.

* * * * *